March 17, 1936.  J. G. DICKSON  2,034,610

GASKET

Filed Jan. 22, 1934  2 Sheets-Sheet 1

JAMES G. DICKSON
INVENTOR

PER  *[signature]*
ATTORNEY

March 17, 1936.  J. G. DICKSON  2,034,610
GASKET
Filed Jan. 22, 1934   2 Sheets-Sheet 2
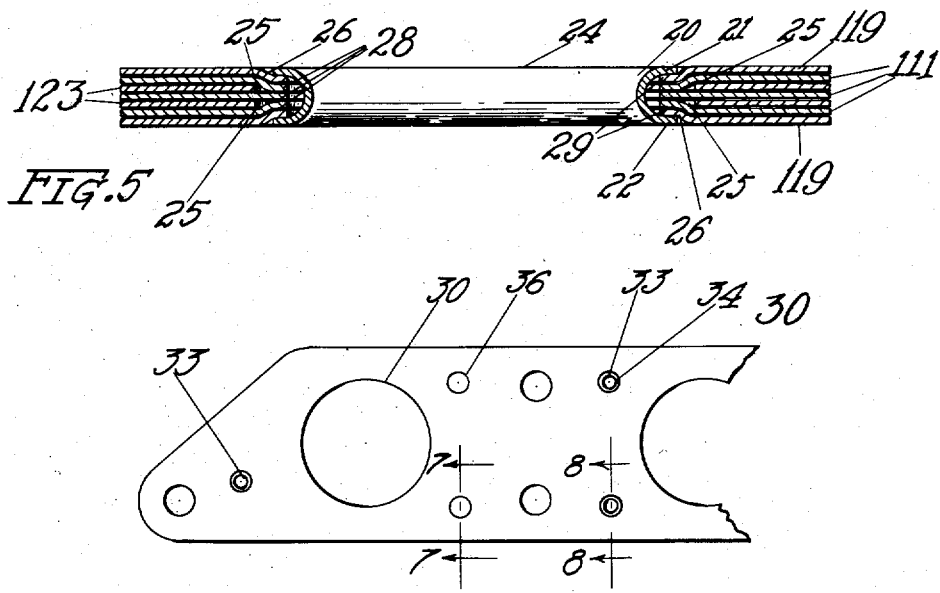
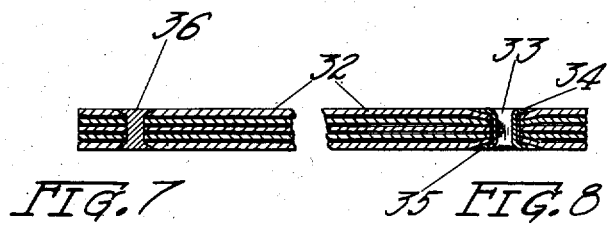
JAMES G. DICKSON
INVENTOR
PER
ATTORNEY Patented Mar. 17, 1936

2,034,610

UNITED STATES PATENT OFFICE 2,034,610

GASKET

James G. Dickson, Glencoe, Ill., assignor to Dickson Gasket Company, Chicago, Ill., a corporation of Illinois Application January 22, 1934, Serial No. 707,659

10 Claims. (Cl. 288—1)

This invention relates to means for sealing against pressure a joint between separable members and has to do particularly with an improved form of gasket.

Included among the objects of the present invention are the following:

Novel means for binding the laminations of a metal gasket into assembly.

An improved method of folding one of the laminations of a laminated metallic gasket about the edge of an opening therein to hold other laminations in assembly while reenforcing the pressure resistance of the entire structure.

A new means of holding the parts of a laminated metallic gasket in assembly while not seriously varying the uniformity of thickness of the body of the gasket and without the use of binding strips about the principal openings therein.

An improved all metal gasket wherein the various laminations may be of different materials or may possess different degrees of ductility.

An improved gasket of metal having parts for binding the laminations thereof together and for regulating the thickness of the body of such gasket at defined sections.

The above objects and other desirable objects are obtained by the novel arrangement, unique combination, and improved construction of the various parts embodying the several forms of devices within the scope of the invention and illustrated in the accompanying two sheets of drawings hereby made a part of this specification, and in which:

Figure 5 is a transverse section taken on the center line of a grommet lined water, cylinder or exhaust hole in a gasket;

Figure 6 is a plan view of a form of the invention in which grommets or solid rivets are employed for holding the laminations together;

Figure 7 is a fragmentary transverse section on the line 7—7 of Figure 6 and illustrates the manner in which a solid rivet is installed in a gasket;

Figure 8 is a view similar to that shown in Figure 7 and in which a grommet is employed in a gasket, the distortion of the laminations being exaggerated, and the view being on the line 8—8 of Figure 6; and Figure 9 is a fragmentary transverse section of a laminated gasket in which spot welding is used for assembly.

Like reference characters are used in the drawings and throughout the description that follows for designating similar parts.

Figure 1:
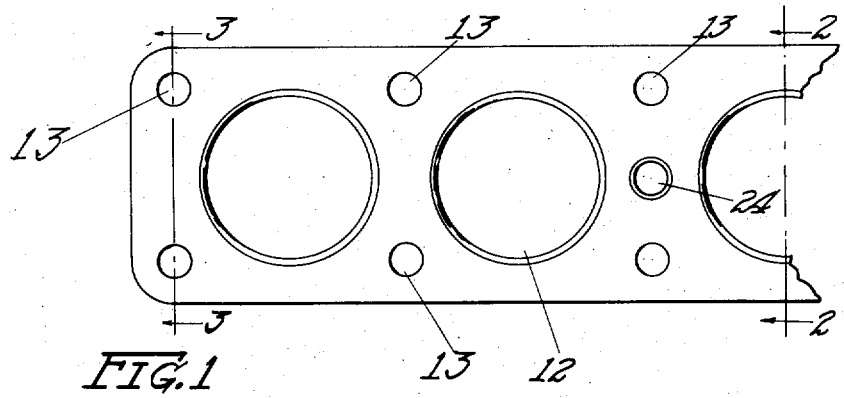
Figure 1 is a fragmentary plan view of a gasket embodying one form of the invention.
Figure 2:
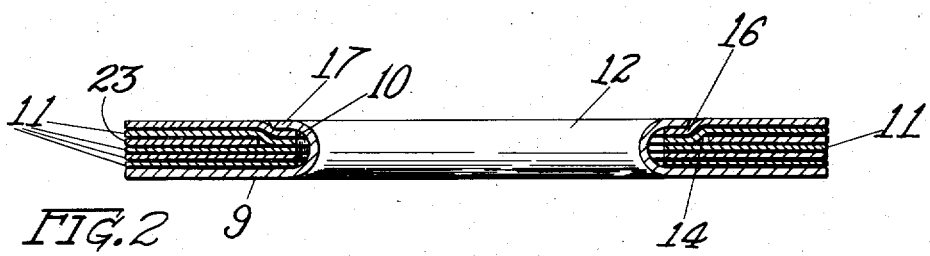
Figure 2 is a transverse section of the gasket shown in Figure 1 on the line 2—2 of said Figure 1 and looking in the direction of the arrows.
Figure 3:
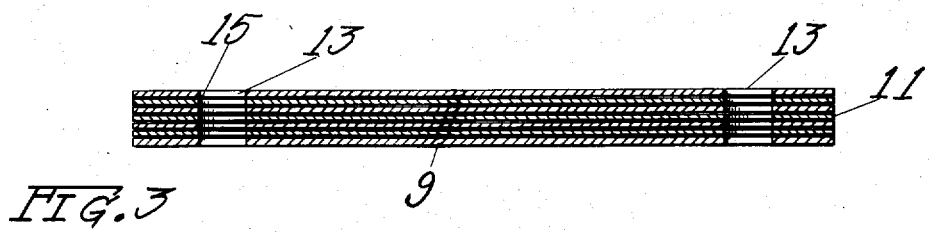
Figure 3 is a transverse section taken on the line 3—3 of Figure 1 and looking in the direction of the arrows.

Figures 1, 2, and 3 illustrate a gasket comprising metal laminations. Such gasket is of a form suitable for use between the cylinder block of an internal combustion engine and the head for such block. Openings 12 fit about the cylinder openings within the engine block. Smaller openings 13 are for stud bolts that conventionally project from the face of an engine block to first guide the gasket and engine head into position upon the block and thereafter to hold the gasket and head in assembly upon the block. Opening 24 is a water hole.

Each lamination contains a plurality of apertures which are concentric with the openings 12, 13, and 24, respectively. Deformation of a gasket of the type illustrated depends to some degree upon the number of laminations assembled and the thickness of each lamination rather than upon the ductility of the metal of each lamination. The laminations should be of a number sufficient to allow compression of the gasket to substantial flatness over its entire area between accurately formed, smooth parallel surfaces.

The third lamination (23) from the top (see Figure 2) has a larger aperture 14 than the other laminations designated 11 and having apertures 10. By using one or more laminations 23 in which apertures 14 are larger than the remaining apertures 10, a means is provided whereby the material of the laminations above or below the larger apertures 14 may be crowded together more closely, as is shown at 16. The aperture in the lowermost lamination 9 is considerably smaller than the apertures 10 and 14, hence the material about the periphery of the aperture in lamination 9 may be deformed inwardly through the apertures 10 and 14 and then formed into a flange 17. Gaskets now made and like that illustrated have been highly successful when one lamination at the interior thereof is .005 inch in thickness and the other laminations are .010 in thickness. When the section of lamination 9 is deformed as described the peripheral edges of the lamination may be somewhat thinned by the incident drawing operation. Sometimes there is a slight bevel at the edges of the apertures 10 and 14 in the various laminations 11 and 23 from the shearing cut that is employed in the fabrication of the thin sheets of material forming the laminations 11 and 23.

The thickness of the flange 17 is generally greater than the combined thickness of the laminations having the largest apertures (14) therein, hence that portion of the gasket immediately about an opening provides the most intimate seal with the adjacent walls which are contacted by the gasket. The thickness of the body of the gasket about an opening 12 thus may be regulated with respect to the average thickness of such body by gauging the thickness of the interior lamination or laminations having an enlarged aperture 14. The thicker such interior lamination or laminations are, the greater will be possibilities of deforming the other laminations.

Figure 4:
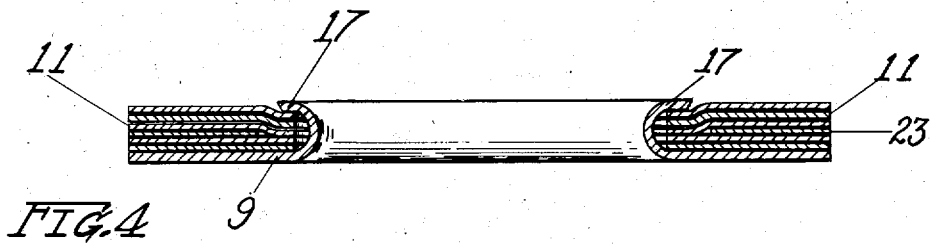
Figure 4 is a sectional view of a gasket having a lamination possessing increased thickness drawn through an opening therein.

By having the thickness of the space thus created of less depth than the thickness of the flange 17, the body of the gasket can be made thicker at a narrow section about each opening. An alternative construction is illustrated in Figure 4. There the flange 17 is not flush with the face of the gasket because of the increased thickness of lamination 9, rather than from decreasing the number of laminations 23 with enlarged apertures 14 or the thickness thereof.

In Figure 3, the openings in the laminations are for bolt holes 13. Alinement of the laminations through which the bolt holes extend is maintained by the several constructions herein described. When grommets are used to maintain the laminations in assembly, the outer faces of the grommets may be flush with or offset to the plane of the adjacent lamination as desired.

In an asbestos filler, the filler is squeezed from the body of the gasket incident to the latter being compressed. The asbestos spreads into the openings therein corresponding to openings 13 and penetrates the threads of the studs extending therethrough. It is thereby made difficult to remove the gasket without destruction. No such undesirable feature is found in the present device in which the entire body is of metal.

Figure 5 illustrates a water hole in a gasket such as aperture 24 in Figure 1, but in a different assembly of laminations. A similar construction may be used for an exhaust hole or even for a pressure hole. Such opening 24 is lined with a grommet 20 having upper and lower flanges 21 and 22. The apertures 25 in two of the interior laminations 123 are enlarged over the apertures 28 in laminations 111 so as to permit the outermost of the laminations 119 which have apertures 29 of the same size as apertures 28 to be pressed inwardly as shown at 26. The flanges 21 and 22 of the grommet are adapted to rest upon the outer laminations 119 so as to be substantially flush therewith, as illustrated. When desired the grommet section may be thickened to project from the adjacent gasket face. The grommet seals the adjacent walls between which the gasket is used and is a protective wall to close the peripheral edges in the laminations about the apertures.

The laminations in the gasket shown in the several figures heretofore discussed may be of a highly ductile metal, as copper, or a part of the inner laminations of a less ductile metal, such as steel. Different results may be had by making the various laminations of metals of different degrees of ductility. When steel is used for one or several interior laminations, material cost may be decreased.

Another embodiment of the invention is shown in Figures 6, 7, and 8. When openings 30 are spaced relatively great distances apart, it may be convenient to secure the metal laminations together at spaced intervals by means of rivets or pins or by grommets. The gasket shown in said figures comprises laminations 32 and is assembled by means of grommets 33 having upper and lower flanges 34 and 35 respectively, or by rivets 36. The ductility of the material comprising the laminations 32 plus the compressibility of the body of the gasket due to the number of such laminations permits of the flanges of the grommets and of the rivets to be flush or substantially flush with the outer faces of the gasket. By thus embedding the holding means 33 or 36 in the outer laminations of the gasket, no interference is had in a uniform compression of a gasket between opposed flat surfaces of the walls of a chamber with which the gasket may be assembled.

Means other than rivets or pins 36 or grommets 33 may be used for holding laminations 32 in assembly. For instance, the laminations 32 may be spot welded at suitable points away from the openings 30 as indicated at 37 in Figure 9. Such spot weldings hold the laminations of the gasket firmly in assembly. The welds generally result in decreased thickness of the gasket over the area of the weld so that the concurrent solidification of the material in cross section will not interfere with the uniform compression of the gasket over its main area.

What is claimed as new and is desired to be secured by Letters Patent of the United States is:

1. A gasket comprising two outside and one or more inside laminations of sheet metal having aligned apertures providing an opening therethrough, the material of one outside lamination extending through such opening and being turned over against the face of the opposite outside lamination, and the total thickness of the inside laminations between the first outside lamination and the turned over portion thereof immediately adjacent said opening being less than the thickness of the inside laminations at a point outside of the turned-over portion by an amount approximately equal to the thickness of said turned over portion.

2. A gasket comprising two outside and two or more inside laminations of sheet metal having aligned apertures providing an opening therethrough, the outside laminations and the inside laminations being of different thicknesses, the material of one outside lamination extending through such opening and being turned over against the face of the opposite outside lamination to form a flange, and the total thickness of said inside laminations between said first outside lamination and said flange immediately adjacent said opening being less than the thickness of the inside laminations at a point outside of the turned-over portion by an amount equal to not less than the thickness of one of said inside laminations.

3. The gasket described in claim 2, and in which said several laminations are of a thickness that said flange does not protrude from the plane of said second outside lamination by an amount as great as the thickness of said flange.

4. A gasket comprising inside and outside laminations of sheet metal having aligned apertures providing an opening therethrough, and means having a portion extending over the face of an outside lamination near such opening for holding said several laminations together at the edges of such opening, the inside laminations beneath the extending portion of said holding means being of reduced total thickness to compensate for the added thickness of said extending portion.

5. An all metal gasket having an aperture therethrough, and comprising two outside and one of more inside laminations of sheet metal, and flanged holding means extending through said aperture, one or more of said inside laminations being cut back from said aperture past the line of the outer edge of the flanged portion of said holding means.

6. A gasket having an aperture therethrough, and comprising two outer and one or more inner laminations of metal, and holding means extending through said aperture and having flanges extending over the faces of the outer laminations, the total thickness of said inner laminations being less beneath said flanges than away therefrom.

7. A gasket having an aperture therethrough, and comprising outer and one or more inner laminations of metal, and holding means extending through said aperture and having flanges extending over the faces of the outer laminations, the total thickness of said inner laminations being less beneath said flanges than away therefrom by an amount approximately equal to the thickness of said flanges.

8. A gasket having an aperture therethrough, and comprising outer and one or more inner laminations of metal, and holding means extending through said aperture and having flanges extending over the faces of the outer laminations, the total thickness of said inner laminations being less beneath said flanges than away therefrom by an amount not less than the thickness of one said inner lamination.

9. A gasket having an aperture therethrough, and comprising outer and one or more inner laminations of metal, and holding means extending through said aperture and having flanges extending over the faces of the outer laminations, the total thickness of said inner laminations being less beneath said flanges than away therefrom by an amount such that said flanges when compressed do not protrude from the plane of said outside laminations the full thickness of said flanges.

10. A gasket having an aperture therethrough, and comprising two outside and one or more inside laminations of sheet metal, and holding means extending through said aperture and having flanges of larger outside dimensions than the dimensions of said aperture, one or more of said inside laminations being cut back from said aperture past the line of the outer edges of said flanges.

JAMES G. DICKSON.

CERTIFICATE OF CORRECTION.

Patent No. 2,034,610.                                           March 17, 1936.

JAMES G. DICKSON.

It is hereby certified that error appears in the printed specification of the above numbered patent requiring correction as follows: Page 3, first column, line 10, claim 5, for "of" first occurrence, read or; and that the said Letters Patent should be read with this correction therein that the same may conform to the record of the case in the Patent Office.

Signed and sealed this 5th day of May, A. D. 1936.

Leslie Frazer (Seal)                                              Acting Commissioner of Patents.

of an outside lamination near such opening for holding said several laminations together at the edges of such opening, the inside laminations beneath the extending portion of said holding means being of reduced total thickness to compensate for the added thickness of said extending portion.

5. An all metal gasket having an aperture therethrough, and comprising two outside and one of more inside laminations of sheet metal, and flanged holding means extending through said aperture, one or more of said inside laminations being cut back from said aperture past the line of the outer edge of the flanged portion of said holding means.

6. A gasket having an aperture therethrough, and comprising two outer and one or more inner laminations of metal, and holding means extending through said aperture and having flanges extending over the faces of the outer laminations, the total thickness of said inner laminations being less beneath said flanges than away therefrom.

7. A gasket having an aperture therethrough, and comprising outer and one or more inner laminations of metal, and holding means extending through said aperture and having flanges extending over the faces of the outer laminations, the total thickness of said inner laminations being less beneath said flanges than away therefrom by an amount approximately equal to the thickness of said flanges.

8. A gasket having an aperture therethrough, and comprising outer and one or more inner laminations of metal, and holding means extending through said aperture and having flanges extending over the faces of the outer laminations, the total thickness of said inner laminations being less beneath said flanges than away therefrom by an amount not less than the thickness of one said inner lamination.

9. A gasket having an aperture therethrough, and comprising outer and one or more inner laminations of metal, and holding means extending through said aperture and having flanges extending over the faces of the outer laminations, the total thickness of said inner laminations being less beneath said flanges than away therefrom by an amount such that said flanges when compressed do not protrude from the plane of said outside laminations the full thickness of said flanges.

10. A gasket having an aperture therethrough, and comprising two outside and one or more inside laminations of sheet metal, and holding means extending through said aperture and having flanges of larger outside dimensions than the dimensions of said aperture, one or more of said inside laminations being cut back from said aperture past the line of the outer edges of said flanges.

JAMES G. DICKSON.

CERTIFICATE OF CORRECTION.

Patent No. 2,034,610. March 17, 1936.

JAMES G. DICKSON.

It is hereby certified that error appears in the printed specification of the above numbered patent requiring correction as follows: Page 3, first column, line 10, claim 5, for "of" first occurrence, read or; and that the said Letters Patent should be read with this correction therein that the same may conform to the record of the case in the Patent Office.

Signed and sealed this 5th day of May, A. D. 1936.

Leslie Frazer (Seal) Acting Commissioner of Patents.